United States Patent
Vasbø et al.

(10) Patent No.: US 11,692,822 B2
(45) Date of Patent: Jul. 4, 2023

(54) METHODS AND SYSTEMS FOR APPLICATION OF WAX ON GEOPHYSICAL STREAMERS

(71) Applicant: PGS Geophysical AS, Oslo (NO)

(72) Inventors: Christian Vasbø, Oslo (NO); Rune Tønnessen, Oslo (NO); Thomas Hauge, Oslo (NO); Par Johansson, Trollhättan (SE); Mikael Tuved, Trollhättan (SE); Kaj Andersson, Trollhättan (SE); Andreas Carlen, Trollhättan (SE)

(73) Assignee: PGS Geophysical AS, Oslo (NO)

(*) Notice: Subject to any disclaimer, the term of this patent is extended or adjusted under 35 U.S.C. 154(b) by 119 days.

(21) Appl. No.: 15/820,069

(22) Filed: Nov. 21, 2017

(65) Prior Publication Data
US 2018/0321032 A1    Nov. 8, 2018

Related U.S. Application Data

(60) Provisional application No. 62/501,848, filed on May 5, 2017.

(51) Int. Cl.
| | | |
|---|---|---|
| *G01C 13/00* | (2006.01) | |
| *G01V 1/38* | (2006.01) | |
| *B05D 1/02* | (2006.01) | |
| *B05D 1/18* | (2006.01) | |
| *B05D 1/26* | (2006.01) | |
| *B05D 1/40* | (2006.01) | |
| *B05D 3/00* | (2006.01) | |
| *B05D 5/08* | (2006.01) | |

(52) U.S. Cl.
CPC ............... *G01C 13/00* (2013.01); *B05D 1/02* (2013.01); *B05D 1/18* (2013.01); *B05D 1/26* (2013.01); *B05D 1/40* (2013.01); *B05D 3/002* (2013.01); *B05D 5/08* (2013.01); *G01V 1/3843* (2013.01)

(58) Field of Classification Search
CPC .......... B05D 3/002; B05D 3/10; B05D 3/108; B05D 1/40; B05D 1/26; B05D 1/18; B05D 1/02; B05D 5/08; G01V 1/3843; B08B 1/04; B08B 1/008; B63C 11/52
USPC .............................. 156/278; 114/222; 427/8
See application file for complete search history.

(56) References Cited

U.S. PATENT DOCUMENTS

| | | | | |
|---|---|---|---|---|
| 2,944,510 A | * | 7/1960 | Jeremiah | B05C 1/027 118/233 |
| 4,717,601 A | * | 1/1988 | Bocquet | A63C 11/08 118/302 |
| 4,990,184 A | | 2/1991 | Dotson et al. | |
| 5,018,267 A | * | 5/1991 | Schoen | B32B 37/0038 156/295 |

(Continued)

OTHER PUBLICATIONS

European Search Report for Application No. EP 18170612.8-1003 dated Oct. 1, 2018.

*Primary Examiner* — Francisco W Tschen
*Assistant Examiner* — Abhishek A Patwardhan (57) ABSTRACT

Embodiments relate generally to marine geophysical surveying. More particularly, embodiments relate to a wax application system for application of a wax coating to a surface of a streamer. An embodiment may comprise a marine geophysical survey system. The marine geophysical survey system may comprise a streamer and a wax application system operable to receive the streamer on deployment and apply a wax coating to the streamer as the streamer is being deployed from a survey vessel into a body of water.

2 Claims, 8 Drawing Sheets

(56) References Cited

U.S. PATENT DOCUMENTS

| | | | |
|---|---|---|---|
| 5,123,569 A * | 6/1992 | Lindner | B29C 67/241 |
| | | | 219/421 |
| 9,116,253 B2 | 10/2015 | Yokohoma et al. | |
| 9,302,653 B2 * | 4/2016 | Kohonen | B05B 12/30 |
| 9,377,560 B2 | 6/2016 | Macquin et al. | |
| 2010/0151140 A1 * | 6/2010 | O'Neal | C09D 5/1693 |
| | | | 427/408 |
| 2014/0033962 A1 * | 2/2014 | MacQuin | B63C 11/52 |
| | | | 114/222 |
| 2014/0241120 A1 | 8/2014 | Blackball et al. | |
| 2014/0242261 A1 * | 8/2014 | Macquin | G01V 1/186 |
| | | | 427/8 |
| 2014/0242285 A1 * | 8/2014 | Pettersson | B05B 12/00 |
| | | | 427/427.2 |
| 2015/0226869 A1 * | 8/2015 | Harrick | B05D 3/10 |
| | | | 405/158 |
| 2015/0285949 A1 | 10/2015 | Macquin et al. | |
| 2017/0235017 A1 | 8/2017 | Vasbo et al. | |
| 2017/0285199 A1 | 10/2017 | Harrick | |
| 2018/0281377 A1 * | 10/2018 | Tussing | B05D 1/28 |

* cited by examiner

METHODS AND SYSTEMS FOR APPLICATION OF WAX ON GEOPHYSICAL STREAMERS

CROSS-REFERENCE TO RELATED APPLICATIONS

The present application claims priority to U.S. Provisional Application No. 62/501,848, filed on May 5, 2017, the entire disclosure of which is incorporated herein by reference.

BACKGROUND

Techniques for marine geophysical surveying include seismic surveying and electromagnetic surveying, in which geophysical data may be collected from below the Earth's surface. Geophysical surveying has applications in mineral and energy exploration and production to help identify locations of hydrocarbon-bearing formations. Certain types of marine geophysical surveying, such as seismic or electromagnetic surveying, may include towing an energy source at a selected depth—typically above the seafloor—in a body of water. One or more streamers also may be towed in the water at selected depths—typically above the seafloor—by the same or a different vessel. The streamers are typically cables that include a plurality of sensors disposed thereon at spaced apart locations along the length of the cable. Some geophysical surveys locate sensors on ocean bottom tables or nodes in addition to, or instead of, streamers. The energy sources may be configured to generate a signal that is related to a parameter being measured by the sensor. At selected times, the energy source may be actuated to generate, for example, seismic or electromagnetic energy that travels downwardly into the subsurface rock. Energy that interacts with interfaces, generally at the boundaries between layers of rock formations, may be returned toward the surface and detected by the sensors on the streamers. The detected energy may be used to infer certain properties of the subsurface rock, such as structure, mineral composition, and fluid content, thereby providing information useful in the recovery of hydrocarbons.

Unfortunately, marine organisms may adhere to and then grow on nearly everything that is placed in water for extended periods of time, including marine geophysical sensor cables, such as towed streamers or ocean-bottom cables. For convenience, any such marine geophysical sensor cable will be referred to herein as a "streamer." A streamer may include a marine streamer that comprises seismic sensors, electromagnetic sensors, or any combination thereof.

Marine growth (also known as biofouling) often refers to barnacle growth but is intended to also include the growth of mussels, oysters, algae, bacteria, tubeworms, slime, and other marine organisms. This marine growth is particularly problematic with streamers as the marine growth can increase drag resistance of the streamer, leading to increased fuel costs and/or reduced production speed. An additional problem with marine growth includes reduced data quality due to increased noise.

BRIEF DESCRIPTION OF THE DRAWINGS

These drawings illustrate certain aspects of some of the embodiments of the present invention and should not be used to limit or define the invention.

DETAILED DESCRIPTION

It is to be understood that the present disclosure is not limited to particular devices or methods, which may, of course, vary. It is also to be understood that the terminology used herein is for the purpose of describing particular embodiments only, and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

Embodiments relate generally to marine geophysical surveying. More particularly, embodiments relate to a wax application system for application of a wax coating to a surface of a streamer. The wax coating can be at a solid or semi-solid state at room temperature (approximately 23° C.). The wax coating may protect the streamer by preventing marine growth, which would otherwise negatively interfere with streamer operation. Accordingly, by application of the wax coating, operation of the streamer in marine surveying may be improved.

Figure 1:
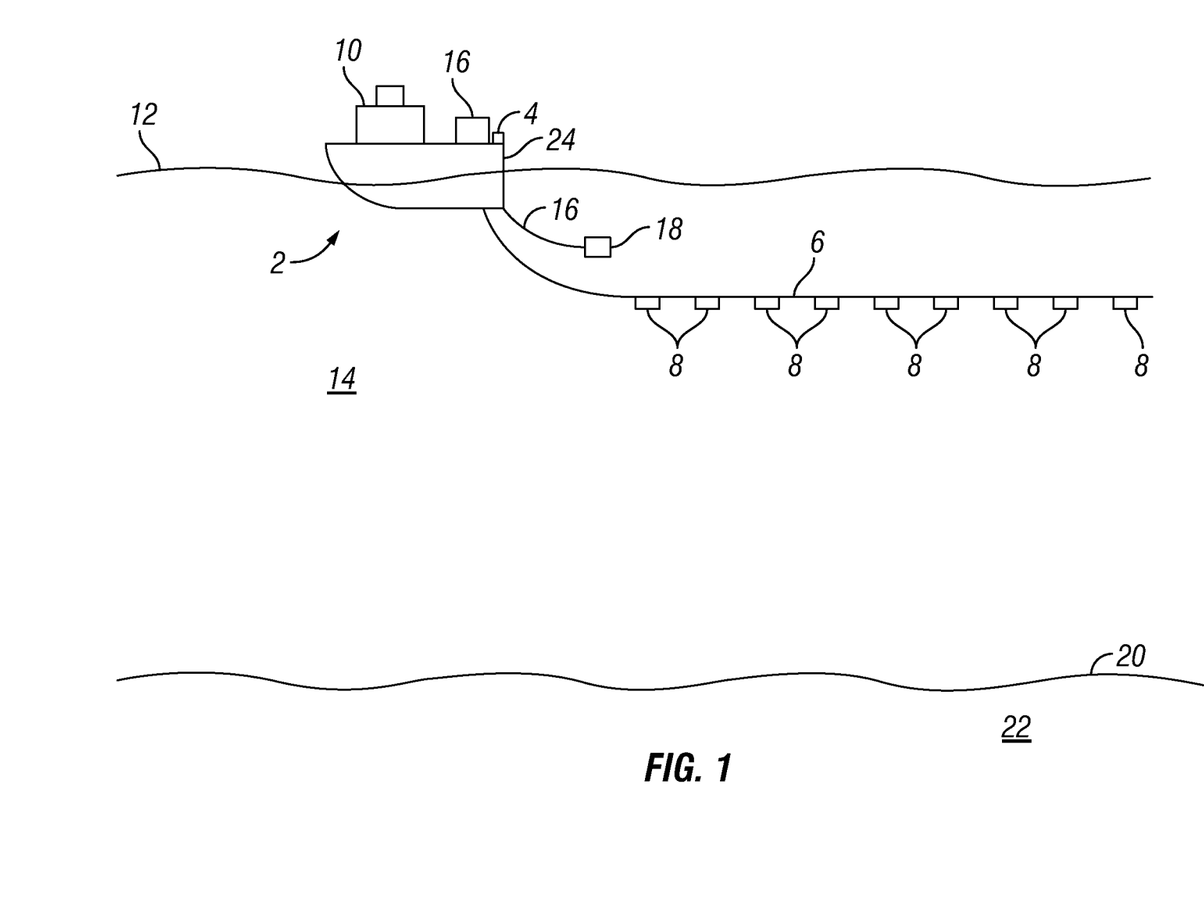
FIG. 1 illustrates an embodiment of a marine seismic survey that employs a wax application system on the survey vessel.

Referring now to FIG. 1, marine geophysical survey system 2 that employs wax application system 4 is illustrated in accordance with embodiments of the disclosure. As will be discussed in more detail below, in some embodiments, wax application system 4 may be operable to apply a wax coating (e.g., wax coating 38 shown on FIG. 3) to streamer 6. Streamer 6 may include a long cable (or other elongated structure) on which geophysical sensors 8 may be disposed at spaced apart locations along the length of streamer 6. In another embodiment, survey vessel 10 may include a plurality of wax application systems 4 operable to apply the wax coating to a plurality of streamers 6.

In the illustrated embodiment, marine geophysical survey system 2 may include survey vessel 10 on which wax application system 4 may be employed. Survey vessel 10 may move along surface 12 of body of water 14, such as a lake or ocean. Survey vessel 10 may include thereon equipment, shown generally at 16 and collectively referred to herein as a "recording system." Recording system 16 may include devices (e.g., storage devices, microprocessors, etc. (none shown separately)) for detecting and making a time indexed record of signals generated by each of geophysical sensors 8 (explained further below) and for actuating energy source 18 at selected times. Recording system 16 may also include devices (none shown separately) for determining the geodetic position of survey vessel 10 and various geophysical sensors 8.

In some embodiments, survey vessel 10 or another vessel may tow at least one streamer 6 on which geophysical sensors 8 may be disposed. As illustrated, energy source 18 and streamer 6 may be towed above water bottom 20. Streamer 6 may be a towed marine seismic streamer, a towed marine electromagnetic streamer, or a combination thereof. While not shown, some marine seismic surveys locate geophysical sensors 8 on ocean bottom cables or nodes in addition to, or instead of, streamer 6. As illustrated, geophysical sensors 8 may be disposed at spaced apart locations on streamer 6. Geophysical sensors 8 may be, without limitation, seismic sensors such as geophones, hydrophones, or accelerometers, or electromagnetic field sensors, such as electrodes or magnetometers. Geophysical sensors 8 may generate response signals, such as electrical or optical signals, in response to detecting energy emitted from energy source 18 after the energy has interacted with formations 22 below water bottom 20. In some embodiments, more than one streamer 6 may be towed by survey vessel 10 or another vessel, and streamers 6 may be spaced apart laterally, vertically, or both laterally and vertically. The detected energy may be used to infer certain properties of the subsurface rock, such as structure, mineral composition, and fluid content, thereby providing information useful in the recovery of hydrocarbons.

In accordance with embodiments, a geophysical data product may be produced. The geophysical data product may include geophysical data and may be stored on a non-transitory, tangible, computer-readable medium. The geophysical data product may be produced offshore (i.e. by equipment on a vessel) or onshore (i.e. at a facility on land) either within the United States or in another country. If the geophysical data product is produced offshore or in another country, it may be imported onshore to a facility in the United States or another country. Once onshore, geophysical analysis, including further data processing, may be performed on the geophysical data product.

In some embodiments, wax application system 4 may be located on survey vessel 10. As illustrated, wax application system 4 may be located at or near stern 24 of survey vessel 10 so that wax application system 4 may be proximate streamer 6 during its deployment into, or recovery from, body of water 14. During recovery and/or deployment, marine growth may be scraped, or otherwise removed, to prepare streamer 6 for application of the wax coating. In some embodiments, a major portion of the marine growth may be removed from streamer 6 during its recovery onto survey vessel 10. During subsequent deployment of streamer 6 into body of water 14, the wax coating may be applied to streamer 6. The wax coating may be applied by applying a wax to streamer 6 using any suitable technique, including, but not limited to, spray coating, drip coating, or solid application. Prior to application of the wax coating, embodiments may include cleaning and drying streamer 6 to prepare the surface of streamer 6 for the wax coating.

Figure 2:
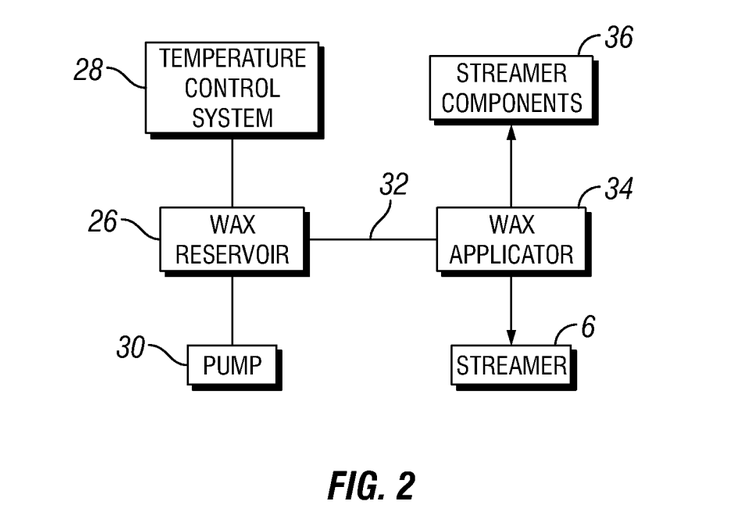
FIG. 2 illustrates an embodiment of a wax application system.

Referring now to FIG. 2, an embodiment of wax application system 4 is illustrated in more detail. It should be appreciated that while the below description of wax application system 4 is applicable to application of wax in a liquid state, embodiments may also be used that apply wax in a solid or semi-solid state. In the illustrated embodiment, wax application system 4 comprises wax reservoir 26, temperature control system 28, pump 30, applicator conduit 32, and wax applicator 34. Wax application system 4 may be operable to deliver wax contained in wax reservoir 26 to wax applicator 34 for application of a wax coating to streamer 6 and/or streamer components 36. The wax coating may be applied while streamer 6 is being deployed into body of water 14 (e.g., shown on FIG. 1). The wax coating may also be applied to streamer components 36 that may not be stored with streamer 6 on survey vessel 10 and, instead, are attached to streamer 6 during deployment. Examples of streamer components 36 may include positioning and navigation control devices (e.g., birds) with one or more surfaces for positioning streamer 6, retrievers, and other modules. Additional examples of streamer components 36 may include, but are not limited to acoustic pingers, external compasses, and external protective coverings, among others.

In the embodiment of FIG. 2, wax reservoir 26 may store a wax. Wax reservoir 26 may be any suitable container for storing the wax. The wax may be stored in wax reservoir 26 in a solid or semi-solid state, for example. The wax may generally be in a solid (or semi-solid) state at room temperature (approximately 23° C.). Suitable waxes should adhere to surfaces of streamer 6 when sprayed or otherwise applied to streamer 6. If applied in a liquid or semi-solid state, the wax should readily transition into a solid state to form a wax coating in a solid state on streamer 6. In some embodiments, the wax can form the wax coating in a solid state prior to entry of streamer 6 into body of water 14 (e.g., shown on FIG. 1). In this manner, the wax coating should adhere to streamer 6 and not be readily washed off as streamer 6 is towed, as waxes are typically insoluble in water. Suitable waxes should have a melting point that is greater than the temperature of body of water 14, referred to herein as "water temperature." In some embodiments, the wax may have a melting point that is equal to or exceeds the water temperature. In some embodiments, the wax may have a melting point that is equal to or exceeds the water temperature by at least about 5° C. In some embodiments, the wax may have a melting point that exceeds the water temperature by about 0° C. to about 30° C. In some embodiments the wax may have a melting point that does not exceed the temperature of the water by more than a predetermined amount. If the melting point is too low, the wax coating can soften and prematurely be washed off of streamer 6. Alternatively, if the melting point is too high, the wax coating can be too brittle and not be capable of withstanding the stresses associated with towing. Suitable waxes may include, but are not limited to, animal waxes, plant waxes, petroleum waxes, polyethylene waxes, and combinations thereof. Animal waxes may include waxes synthesized by animals (including insects) as well as chemically modified versions thereof. Plant waxes may include waxes synthesized by plants as well as chemically modified versions thereof. Petroleum waxes may include waxes derived from petroleum. Polyethylene waxes may include waxes derived from polyethylene. Specific examples of suitable waxes may include, but are not limited to, cocoa butter, illipe butter, lanolin, cetyl palmitate, bayberry wax, lanolin alcohol, paraffin wax, silicone wax, and sumax wax, among others. One of ordinary skill in the art, with the benefit of this disclosure, should be able to select a suitable wax based, for example, on melting point, among other factors.

Wax application system 4 may also include temperature control system 28. Temperature control system 28 may include one or more heating elements to heat the wax in wax reservoir 26 to above its melting point so that the wax can be delivered from wax reservoir 26 to wax applicator 34. In some embodiments, temperature control system 28 may heat the wax in wax reservoir 26 to a temperature of about 40° C. or greater. This temperature may also be maintained in wax reservoir 26 so that the wax remains in a liquid state. In some embodiments, temperature control system 28 not only controls the temperature of the wax in wax reservoir 26, but can also control the temperature of the wax in applicator conduit 32 and wax applicator 34, for example, to prevent (or reduce) the wax prematurely transitioning to a solid state after it exits wax reservoir 26, but prior to its application onto streamer 6. By way of example, temperature control system 28 may be operable to maintain the temperature of the wax in applicator conduit 32 and/or wax applicator 34 above its melting point. In some embodiments, temperature control system 28 may also include humidity control, including, one or more sensors, to monitor humidity in wax application system 4. Humidity may be monitored in wax reservoir 26, applicator conduit 32, and/or wax applicator 34. The humidity control may be operable to add or remove water from the air in wax application system 4. In embodiments, the melting point of the wax can be adjusted in response to a change in the temperature of the water into which streamer 6 is to be deployed. For example, if vessel 10 moves from warmer water to cooler water, temperature control system 28 can adjust additives or the mix ratio of the wax so that the wax will have a melting point at a predetermined temperature above the temperature of the water. In embodiments, the wax can be selected in advance to have a melting point at or above an expected water temperature. By of example, the wax may be selected to have a melting point that is equal to or exceeds the water temperature. In some embodiments, the wax may be selected to have a melting point that does not exceed the temperature of the water by more than a predetermined amount. In some embodiments, the water temperature may be measured and then the wax may be selected to have a melting point that does not exceed the temperature of the water by more than a predetermined amount. The predetermined amount may range, for example, from about 0° C. to about 30° C.

Pump 30 may be operable to move the wax from wax reservoir 26 to wax applicator 34, for example, by way of applicator conduit 32. Pump 30 may include any of a variety of suitable pumps, including, but not limited to, centrifugal and positive displacement pumps, suitable for moving the wax. While FIG. 2 illustrates use of pump 30, it should be understood that, in some embodiments, wax reservoir 26 may be arranged so that the wax can be delivered to pump applicator 34 by gravity feed instead of pump 30 or by gravity feed in combination with pump 30 to provide desired quantities of the wax.

Wax applicator 34 may be operable to apply a wax coating onto streamer 6 and/or streamer components 36. Wax applicator 34 may include nozzles (e.g., nozzles 52 shown on FIGS. 4 and 6) or other suitable device for application of the wax to streamer 6 and/or streamer components 36. Suitable techniques for application of the wax may include, but are not limited to, spraying, brushing, rubbing, blowing, or dripping. In some embodiments, the wax applicator 34 may spray the wax in a liquid state onto streamer 6 and/or streamer components 36, for example, to form a wax coating. The wax may then be allowed to transition from liquid (or semi-solid) to a solid phase on the streamer 6 and/or streamer components 36. To avoid premature removal of the wax, in particular embodiments, the wax should transition from the solid state prior to entry of streamer 6 into body of water 14 (e.g., shown on FIG. 1). Wax applicator 34 may independently control the amount of wax applied to streamer 6 so that the thickness of wax coating may be independent of the speed streamer 6 passes through wax applicator 34. For the streamer components 36 that are removed from streamer 6 for storage, the wax may be applied to streamer components 36 and then allowed to transition to a solid. The streamer components 36 with a wax coating may then be attached to streamer 6 as streamer 6 is deployed into body of water 14.

Figure 3:
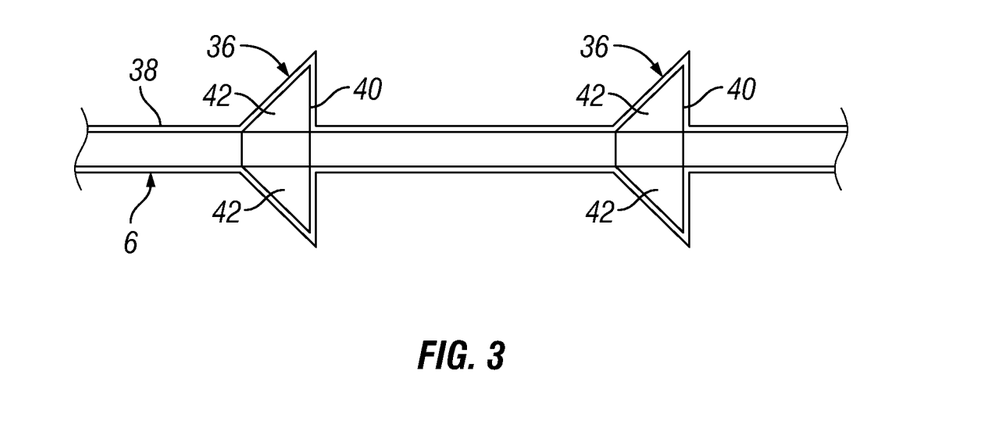
FIG. 3 illustrates an embodiment of a wax coating on a streamer.

FIG. 3 illustrates streamer 6 with wax coating 38 in more detail. As previously described wax coating 38 may be applied to streamer 6 during deployment into body of water 14 (e.g., shown on FIG. 1). Wax coating 38 may include a wax that has dried into a solid state. In the illustrated embodiment, wax coating 38 may also be applied to streamer components 36, such as position control devices 40 that include one or more wings 42. Wax coating 38 may have any suitable thickness based on a number of factors, including, but not limited to, water temperature, type of wax, and deployment time. In some embodiments, wax coating 38 may have a thickness of about 0.01 millimeters to about 1 millimeter. It should be understood that the present embodiments should not be limited to the disclosed range for thickness of wax coating 38, but rather, in some embodiments, wax coating 38 may have a thickness outside this range.

Figure 4:
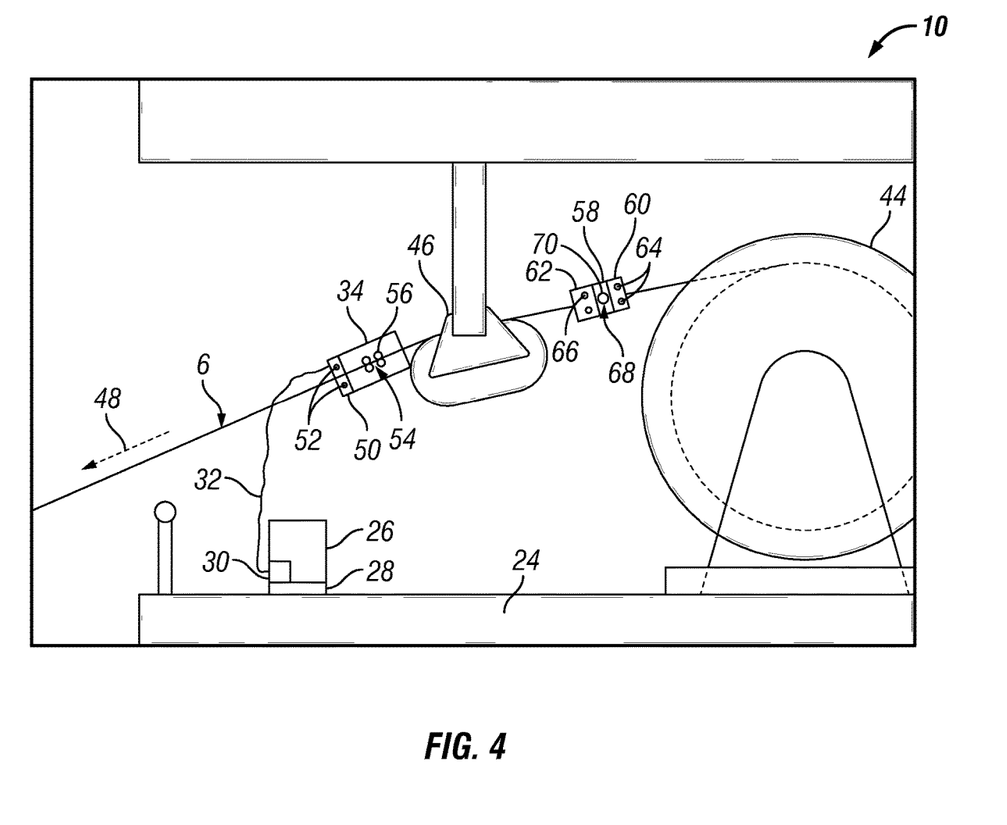
FIG. 4 illustrates an embodiment of a wax application system for spraying wax onto a streamer

FIG. 4 illustrates an embodiment of wax application system 4 disposed on survey vessel 10. As illustrated, wax application system 4 may be disposed on stern 24 of survey vessel 10. In the illustrated embodiment, streamer 6 may be stored on drum 44. Streamer 6 may be unwound from drum 44 and deployed in body of water 14 (e.g., shown on FIG. 1). In some embodiments, spooling block 46 (e.g., a Neilsen block) or other suitable device may be used to aid in deployment of streamer 6 from drum 44. In the illustrated embodiment, streamer 6 may be deployed in the direction indicated by arrow 48.

As illustrated, streamer 6 may pass through wax applicator 34 prior to deployment. In the illustrated embodiment, wax applicator 34 may be positioned on survey vessel 10 such that spooling block 46 is disposed between wax applicator 34 and drum 44; however, other suitable locations for wax applicator 34 may be used depending, for example, on the particular application. As previously described, wax applicator 34 may apply wax coating 38 (e.g., shown on FIG. 3) to streamer 6. Wax may be supplied to wax applicator 34 from wax reservoir 26 by way of applicator conduit 32. Temperature control system 28 may heat the wax and maintain the wax in a liquid state. Pump 30 may be used to deliver the wax from wax reservoir 26 to wax applicator 34 by way of applicator conduit 32. While wax reservoir 26, temperature control system 28, and pump 30 are shown on stern 24 of survey vessel 10, it is not necessary for these components of wax application system 4 to be disposed on stern 24, and they can be disposed on survey vessel 10 in another suitable location depending, for example, on the particular arrangement of survey vessel 10.

In some embodiments, wax applicator 34 may direct wax in a liquid state onto streamer 6 to form wax coating 38 (e.g., shown on FIG. 3). After its application, wax coating 38 may transition to a solid state so that it should not be readily removed after deployment. As illustrated, wax applicator 34 may include a nozzle unit 50 for application of the wax. Nozzle unit 50 may include nozzles 52 for directing the wax onto the streamer 6. Nozzles 52 may be arranged in nozzle unit 50 in any suitable configuration. In some embodiments, there may be three or more of nozzles 52 arranged around streamer 6 so that wax may be evenly distributed on streamer 6 (or as evenly as practical). In a particular embodiment, the nozzles 52 may be airless nozzles in which air is not injected into the wax. Airless nozzles may be used, for example, to prevent premature cooling of the wax before it is applied to streamer 6. In some embodiments, nozzle unit 50 may be enclosed with nozzles 52 disposed in nozzle unit 50. For example, nozzle unit 50 may be in the form of a spray chamber. The streamer 6 may pass through the nozzle unit 50 with the nozzles 52 applying the wax to the streamer 6 in the nozzle unit 50. The air in the nozzle unit 50, in these embodiments, may be heated, for example, to prevent the wax from transforming to the solid state after leaving the nozzles 52 but prior to contacting the streamer 6. The applicator conduit 32 may also be heated to maintain the wax in a liquid state.

In some embodiments, wax applicator 34 may further include a device, such as a streamer positioning assembly 54, for holding wax applicator 34 on streamer 6 while allowing streamer 6 to pass there through. Streamer positioning assembly 54 may also position nozzles 52 at a fixed distance from streamer 6. Streamer positioning assembly 54 may include wheels 56 (e.g., castors or rollers) or other suitable devices, such as belts or continuous tracks, that grip streamer 6 and apply a slight compression force. In the illustrated embodiment, streamer positioning assembly 54 includes two sets of wheels 56. Streamer positioning assembly 54 may be configured to open while applying the compression force to ensure that wax applicator 34 both follows inconsistencies in streamer diameter and positions nozzles 52 concentrically (or as concentrically as practical) around streamer 6. Streamer positioning assembly 54 may be configured to open sufficiently to allow streamer attachments to pass through. In the illustrated embodiments, streamer positioning assembly 54 is positioned before nozzles 52 with respect to direction (indicated by arrow 48) of movement of streamer 6.

Cleaning unit 58 may also be disposed on survey vessel 10. Where used, cleaning unit 58 may be operable, for example, to prepare streamer 6 for application of the wax. As illustrated, cleaning unit 58 may be disposed between spooling block 46 and drum 44; however, other locations for cleaning unit 58 may also be suitable depending, for example, on the particular application. Cleaning unit 58 may include a fluid application unit 60 and a drying unit 62. Fluid application unit 60 may include fluid nozzles 64 operable to apply a cleaning fluid onto streamer. Cleaning fluid may include any suitable fluid for cleaning streamer 6, such as air and water (e.g., freshwater, seawater). In some embodiments, the water may include hot water that has been heated to a temperature greater than ambient temperature. Drying unit 62 may include gas nozzles 66 operable to apply a gaseous fluid, such as air, onto streamer 6. The gaseous fluid may blow off the cleaning fluid from streamer 6 so that the cleaning fluid does not dry on streamer 6. In other embodiments, the gaseous fluid may dry the cleaning fluid on streamer 6. In some embodiments, the gaseous fluid may be passed through an air drier to remove moisture from the air prior to directing the gaseous fluid onto the streamer 6. Cleaning unit 58 may further include a device, such as cleaning unit positioning assembly 68, for holding cleaning unit 58 on streamer 6 while allowing streamer 6 to pass there through. Cleaning unit positioning assembly 68 may also position fluid nozzles 64 and gas nozzles 66 at a fixed distance from streamer 6. Cleaning unit positioning assembly 68 may include cleaning unit wheels 70 (e.g., castors or rollers), or continuous tracks that grip streamer 6 and apply a slight compression force on streamer 6. While not shown, an optional device may be used to mechanically remove barnacles or other marine growth from streamer 6 before entering cleaning unit 58. The device may be positioned on the inboard side of cleaning unit 58, for example, between cleaning unit 58 and drum 44. The device may use any suitable mechanism for mechanically removing marine growth, including, but not limited to, scrapers.

Figure 5:
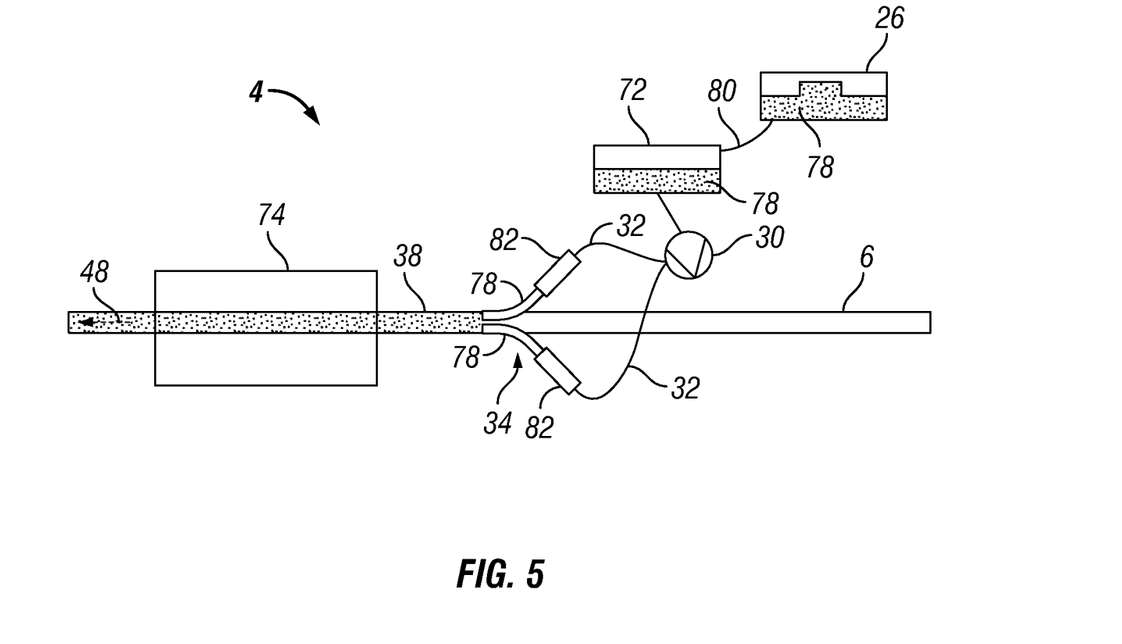
FIG. 5 illustrates another embodiment of a wax application system for application of wax onto a streamer.

FIG. 5 illustrates another embodiment of wax application system 4 for application of wax onto streamer 6. As illustrated, wax application system 4 may include wax reservoir 26, supplemental wax reservoir 72, wax applicator 34, and/or heating chamber 74. Wax reservoir 26 may contain wax 78. Wax 78 in wax reservoir 26 may be heated so that at least a portion of wax 78 transitions to a liquid state (or semi-solid state), for example, to facilitate application onto streamer 6. Any suitable technique may be used for heating wax 78, including, but not limited to, temperature control system 28 (e.g., shown on FIGS. 2 and 4), as previously described. Wax 78 that has been heated to a liquid or semi-solid state may be fed from wax reservoir 26 to supplemental wax reservoir 72 by way of supply conduit 80. Pump 30 may be operable to deliver wax 78 from supplemental wax reservoir 72 to wax applicator 34. As illustrated, pump 30 may deliver wax 78 to wax applicator 34 via applicator conduit 32. While FIG. 5 illustrates delivery of wax 78 to wax applicator 34 from supplemental wax reservoir 72, it is contemplated that pump 30 or other suitable mechanisms may deliver wax 78 directly from wax reservoir 26 to wax applicator 34. In some embodiments, applicator conduit 32 may be heated, for example, to prevent wax 78 from prematurely transitioning to a solid state.

Wax applicator 34 may direct wax 78 onto streamer 6 to form wax coating 38. Streamer 6 may pass through wax applicator 34 in the direction indicated by arrow 48. Wax applicator 34 may include a wax application device 82 in contact with streamer 6 for receiving wax 78 from applicator conduit 32 and applying wax 78 to streamer 6. Wax application device 82 may include any suitable device for applying wax 78, including, but not limited to, brushes, rollers (e.g., rollers 84 shown on FIG. 6), or sponges. As illustrated, multiple wax application devices 82 may be disposed around the circumference of streamer 6 for more uniform application of wax 78 onto streamer 6. Wax application device 82 may direct wax 78 (e.g., in a liquid or semi-solid state) onto streamer 6 to form wax coating 38 (e.g., shown on FIG. 3). After its application, wax coating 38 may transition to a solid state so that it should not be readily removed after deployment. In some embodiments, heating chamber 74 may receive streamer 6 after application of wax coating 38. Heating chamber 74 may heat wax coating 38 after its application onto streamer 6, for example, to soften wax coating 38 so that wax coating 38 can be more evenly distributed on streamer 6. Heating chamber 74 may use any suitable technique for heating, including heated air.

Figure 6:
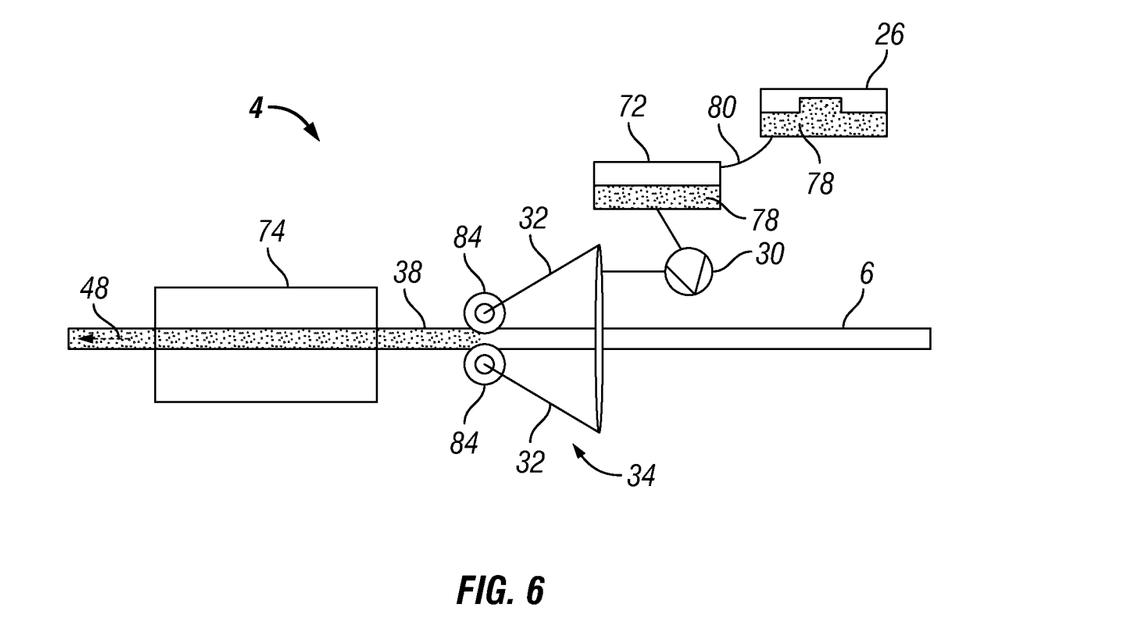
FIG. 6 illustrates another embodiment of a wax application system for application of wax onto a streamer.

FIG. 6 illustrates another embodiment of wax application system 4 for application of wax 78 onto streamer 6. As illustrated, wax application system 4 may include wax reservoir 26, supplemental wax reservoir 72, wax applicator 34, and heating chamber 74. Wax reservoir 26 may contain wax 78. Wax 78 in wax reservoir 26 may be heated so that at least a portion of wax 78 transitions to a liquid state (or semi-solid state). Any suitable technique may be used for heating wax 78, including, but not limited to, temperature control system 28 (e.g., shown on FIGS. 2 and 4), as previously described. Wax 78 may be fed from wax reservoir 26 to supplemental wax reservoir 72 by way of supply conduit 80. Pump 30 may be operable to deliver wax 78 from supplemental wax reservoir 72 to wax applicator 34. As illustrated, pump 30 may deliver wax 78 to wax applicator 34 via applicator conduit 32. While FIG. 6 illustrates delivery of wax 78 to wax applicator 34 from supplemental wax reservoir 72, it is contemplated that pump 30 or other suitable mechanisms may deliver wax 78 directly from wax reservoir 26 to wax applicator 34. In some embodiments, applicator conduit 32 may be heated, for example, to prevent wax 78 from prematurely transitioning to a solid state.

Wax applicator 34 may direct wax 78 onto streamer 6 to form wax coating 38. Streamer 6 may pass through wax applicator 34 in the direction indicated by arrow 48. As illustrated, wax applicator 34 may include rollers 84 in contact with streamer 6 for receiving wax 78 from applicator conduits 32 and applying wax 78 to streamer 6. As illustrated, multiple rollers 84 may be disposed around the circumference of streamer 6 for more uniform application of wax 78 onto streamer 6. Wax 78 may be applied onto the circumference of rollers 84 and then onto streamer 6. Rollers 84 may direct wax 78 (e.g., in a liquid or semi-solid state) onto streamer 6 to form wax coating 38 (e.g., shown on FIG. 3). After its application, wax coating 38 may transition to a solid state so that it should not be readily removed after deployment. In some embodiments, heating chamber 74 may receive streamer 6 after application of wax coating 38. Heating chamber 74 may heat wax coating 38 after its application onto streamer 6, for example, to soften wax coating 38 so that wax coating 38 can be more evenly distributed on streamer 6. Heating chamber 74 may use any suitable technique for heating, including heated air.

Figure 7:
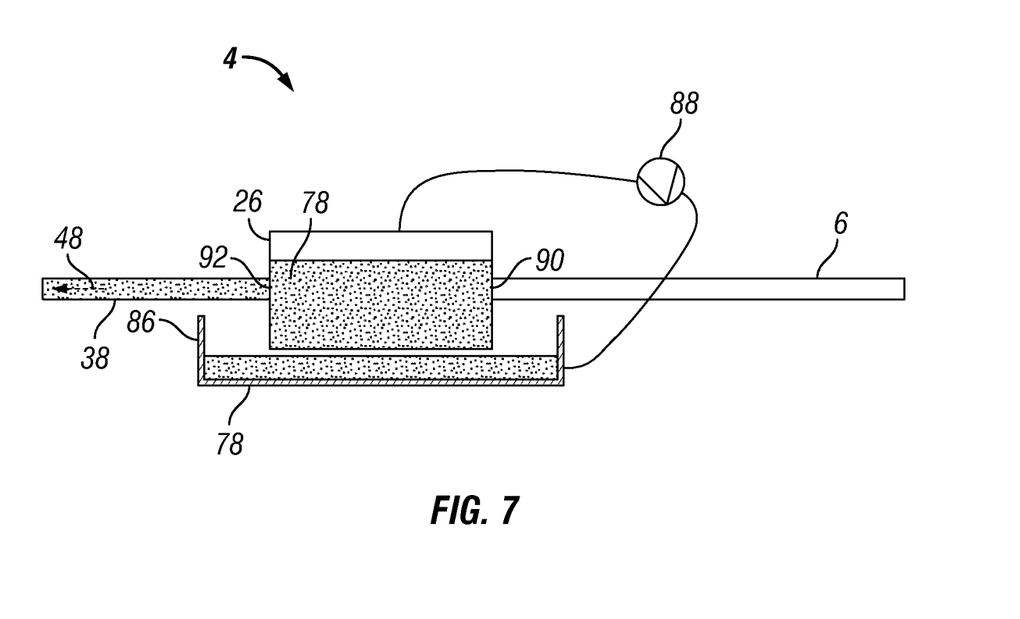
FIG. 7 illustrates another embodiment of a wax application system for application of wax onto a streamer.

FIG. 7 illustrates another embodiment of wax application system 4 for application of wax 78 onto streamer 6. As illustrated, wax application system 4 may include wax reservoir 26, overflow reservoir 86, and recirculating pump 88. Wax reservoir 26 may contain wax 78 that has been heated to a liquid state (or semi-solid state). Wax reservoir 26 may comprise a streamer inlet 90 and a streamer outlet 92. Streamer inlet 90 may receive streamer 6. The streamer 6 may pass through wax 78 in wax reservoir 26, exiting by way of streamer outlet 92. Streamer 6 may pass through wax 78 in the direction indicated by arrow 48. As streamer 6 passes through wax 78, wax 78 may adhere to streamer 6 forming wax coating 38. After its application, wax coating 38 may transition to a solid state so that it should not be readily removed after deployment. As illustrated, overflow reservoir 86 may be disposed under streamer 6 to receive wax 78 from wax reservoir 26 that may spill during application onto streamer 6. Recirculating pump 78 may be in fluid communication with wax reservoir 26 and overflow reservoir 86. Recirculating pump 88 may pump wax 78 from overflow reservoir 86 back into wax reservoir 26.

Figure 8:
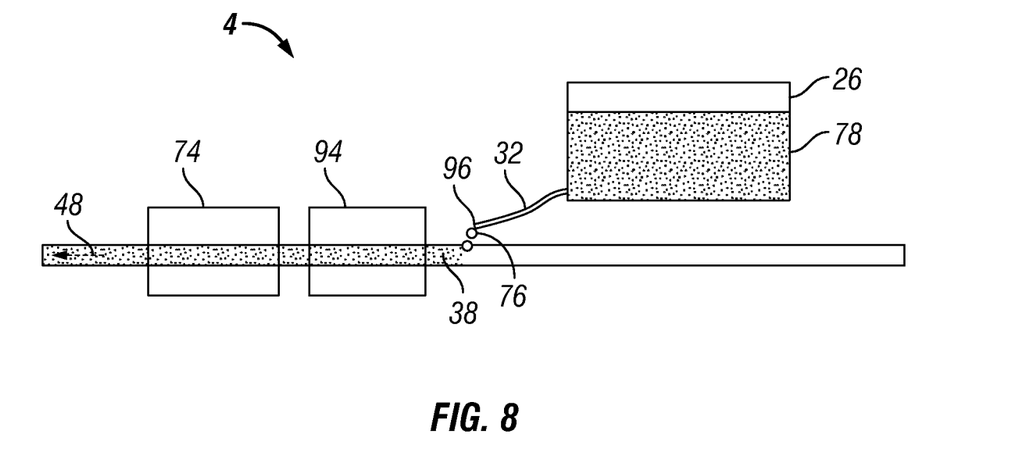
FIG. 8 illustrates another embodiment of a wax application system for application of wax onto a streamer.

FIG. 8 illustrates another embodiment of wax application system 4 for application of wax 78 onto streamer 6. As illustrated, wax application system 4 may include wax reservoir 26, wax removal unit 94, and/or heating chamber 74. Wax reservoir 26 may contain wax 78 (e.g., in a liquid or semi-solid state) that has been heated to a liquid state. Wax 78 may be delivered onto a streamer 6 by way of applicator conduit 32. In the illustrated embodiment, applicator conduit 32 may include an exit port 96 proximate streamer 6. Streamer 6 may pass by applicator conduit 32 in the direction indicated by arrow 48. Applicator conduit 32 may be in fluid connection with wax reservoir 26. In some embodiments, applicator conduit 32 may receive wax 78 from wax reservoir 26 and deliver wax 78 onto streamer 6 with wax 78 pouring from exit port 96 of applicator conduit 32 onto streamer 6 as streamer 6 passes by the exit port 96. Wax 78 may flow around the circumference of streamer 6 forming wax coating 38. After its application, wax coating 38 may transition to a solid state so that it should not be readily removed after deployment. In some embodiments, wax application system 4 may further include wax removal unit 94 for removal of excess wax 78 from streamer 6. Wax removal unit 94 may include scrapers, sponges, brushes, or suitable devices that can remove wax 78 from streamer 6. In some embodiments, heating chamber 74 may receive streamer 6 after application of wax coating 38. Heating chamber 74 may heat wax coating 38 after its application onto streamer 6, for example, to soften wax coating 38 so that wax coating 38 can be more evenly distributed on streamer 6. Heating chamber 74 may use any suitable technique for heating, including heated air.

Figure 9:
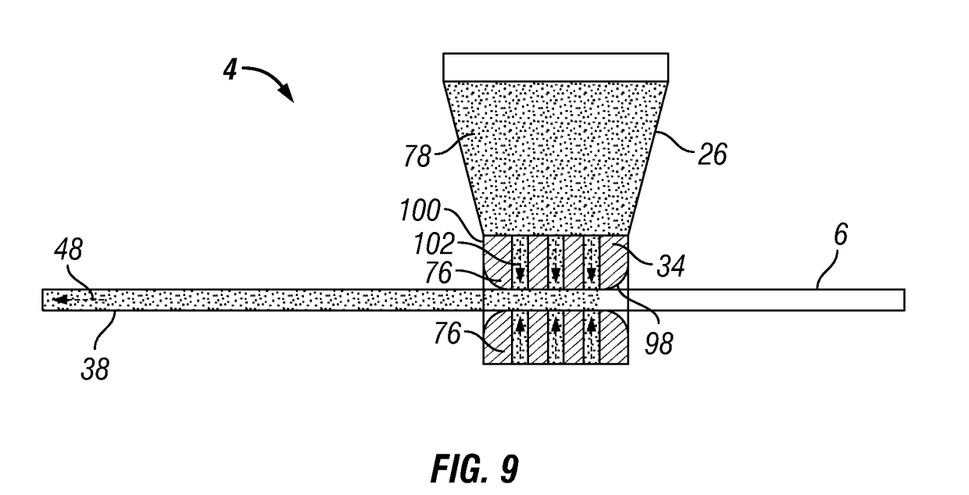
FIG. 9 illustrates another embodiment of a wax application system for application of wax onto a streamer.

FIG. 9 illustrates another embodiment of wax application system 4 for application of wax 78 onto streamer 6. As illustrated, wax application system 4 may include wax reservoir 26 and wax applicator 34. Wax reservoir 26 may contain wax 78 (e.g., in a liquid or semi-solid state) that has been heated to a liquid state. Wax 78 may be delivered onto streamer 6 by way of wax applicator 34. Wax 78 may be gravity fed to wax applicator 34. Wax 78 may flow on wax applicator 34 to contact surface 98 in engagement with streamer 6. Streamer 6 may pass through wax applicator 34 in the direction indicated by arrow 48 so that wax 78 may be transferred from contact surface 98 to streamer 6, forming wax coating 38. To ensure sufficient distribution of wax 78 on streamer 6, in some embodiments, contact surface 98 may be in contact with streamer 6 around the entire circumference of streamer 6. In some embodiments, wax applicator 34 may be heated to maintain wax 78 in the liquid state (or semi-solid state), for example, enabling removal of excess wax 78 and a desired surface finish. Wax applicator 34 may be made from any suitable material, including but not limited to, metals or polymers. Wax applicator 34 may include internal conduits 76 for even distribution of wax 78 onto contact surface 98 in engagement with streamer 6. Wax 78 may pass through internal conduits 76. In some embodiments, wax applicator 34 may be spring loaded, for example, with spring mechanism 100 applying force in direction indicated by arrows 102 pressing contact surface 98 into engagement with streamer 6.

Figure 10:
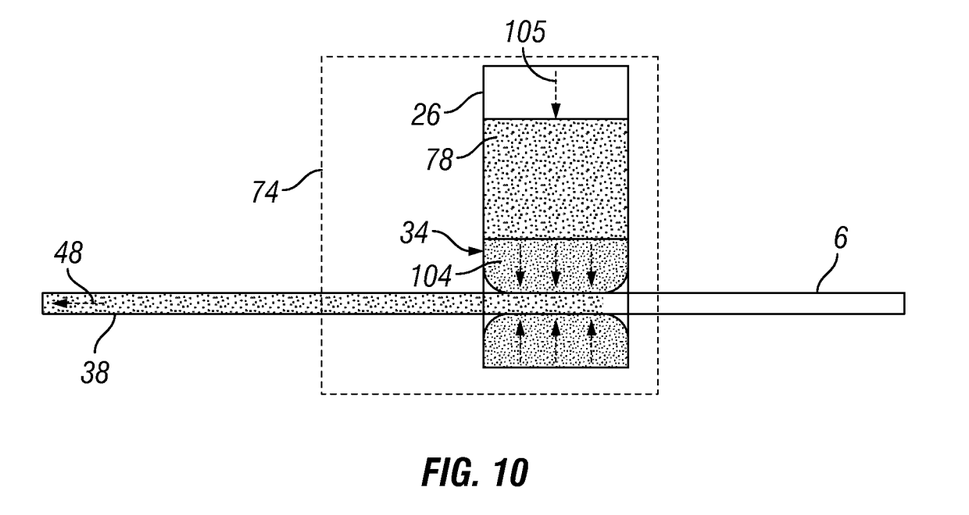
FIG. 10 illustrates another embodiment of a wax application system for application of wax onto a streamer.

FIG. 10 illustrates another embodiment of wax application system 4 for application of wax 78 onto streamer 6. As illustrated, wax application system 4 may include wax reservoir 26 and wax applicator 34. Wax reservoir 26 may contain wax 78 that has been heated to a liquid state (or semi-solid state). Wax 78 may be delivered onto a streamer 6 by way of applicator 34. Wax 78 may be gravity fed to wax applicator 34 or alternatively fed by application of force, indicated by arrow 105. Wax applicator 34 may be in contact with streamer 6. Wax 78 may flow through wax applicator 34 and be transferred to streamer 6, forming wax coating 38. As illustrated, wax applicator 34 may comprise sponge 104 through which wax 78 may pass. Wax 78 may flow on wax applicator 34 to contact surface 98 in engagement with streamer 6. Streamer 6 may pass through wax applicator 34 so that wax 78 may be transferred through sponge 104 to streamer 6 to form wax coating 38. To ensure sufficient distribution of wax 78 on streamer 6, in some embodiments, sponge 104 may be disposed around the entire circumference of streamer 6. In some embodiments, wax applicator 34 may be heated to maintain wax 78 in the liquid state, for example, enabling removal of excess wax 78 and a desired surface finish. As illustrated, wax reservoir 26 and wax applicator 34 may be disposed in a heating chamber 74. In some embodiments, heating chamber 74 may receive streamer 6 so that streamer 6 may enter heating chamber 74, pass through sponge 104 in heating chamber 74, and then exit heating chamber 74 with wax coating 38. Heating chamber 74 may heat wax coating 38 after its application onto streamer 6, for example, to soften wax coating 38 so that wax coating 38 can be more evenly distributed on streamer 6. Heating chamber 74 may use any suitable technique for heating, including heated air.

Figure 11:
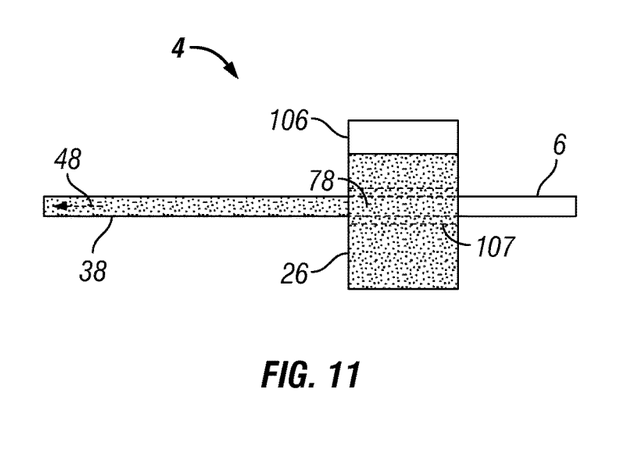
FIG. 11 illustrates another embodiment of a wax application system for application of wax onto a streamer.
Figure 12:
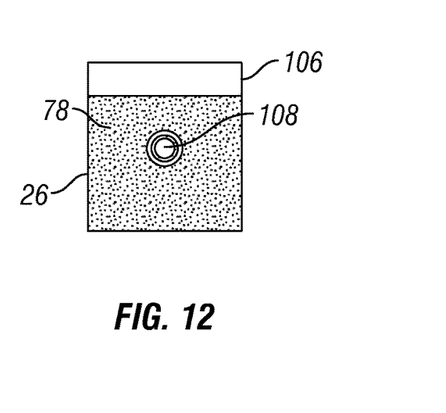
FIG. 12 illustrates an embodiment of a chamber for use in the wax application system of FIG. 11.

FIG. 11 illustrates another embodiment of wax application system 4 for application of wax 78 onto streamer 6. As illustrated, wax application system 4 may include wax reservoir 26. Wax reservoir 26 may contain wax 78 in a solid state. In some embodiments, wax reservoir 26 may enclose streamer 6 as streamer 6 passes through wax reservoir 26. Streamer 6 may pass through wax applicator 34 in the direction indicated by arrow 48 so that wax 78 may be transferred from wax reservoir 26 to streamer 6 as streamer 6 passes through wax reservoir 26. With additional reference to FIG. 12, wax reservoir 26 may include at least one opening 108 through which wax 78 may be forced onto streamer 6. At least one opening 108 may face streamer passage 107 through which streamer 6 passes. As illustrated, wax application system 4 may include a supplemental chamber 106. Supplemental chamber 106 may completely, or at least partially, enclose wax reservoir 26. Supplemental chamber 106 may be connected to wax reservoir 26 so that pressure may be applied to wax reservoir 26 from supplemental chamber 106. Any suitable mechanism may be used to apply force onto wax 78 in wax reservoir 26 from supplemental chamber 106, including, but not limited to, air pressure or mechanical force (e.g., a mechanical spring). In some embodiments, wax 78 in wax reservoir 26 may be heated, for example, to make it more viscous (e.g., a semi-solid) to enable application onto streamer 6. In some embodiments, a post-application heating treatment may be applied to wax coating 38. For example, a heating chamber 74 (e.g., shown on FIGS. 5, 6, 8) may be used to heat wax coating 38 on streamer 6.

Figure 13:
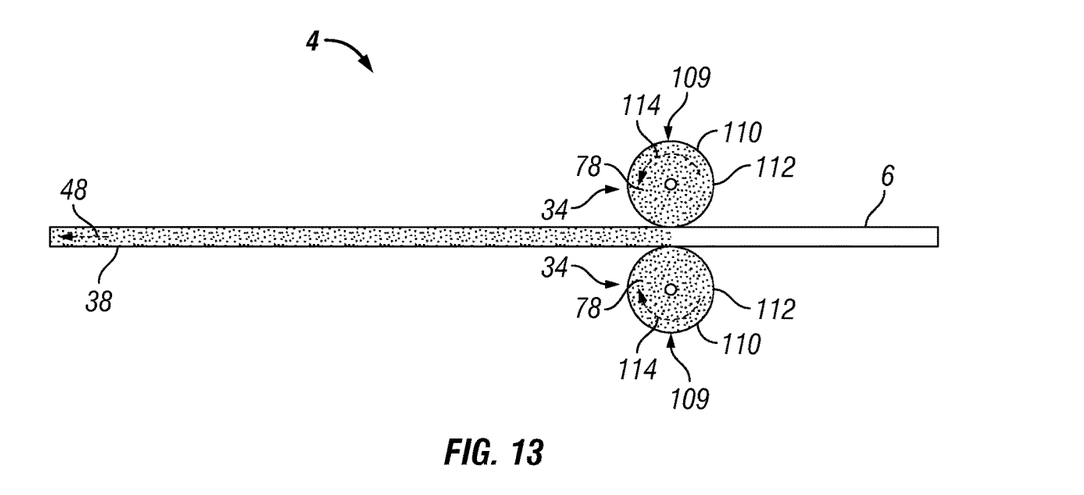
FIG. 13 illustrates another embodiment of a wax application system for application of wax onto a streamer.

FIG. 13 illustrates another embodiment of wax application system 4 for application of wax 78 onto streamer 6. As illustrated, wax application system 4 may include wax applicators 34. As illustrated, wax applicators 34 may include wheel applicators 109, wherein the wheel applicators 109 may include wax 78. Two or more wheel applicators 109 may be positioned around the circumference of streamer 6. In some embodiments, wax 78 may be in a liquid, semi-solid, or solid state. In some embodiments, wheel applicators 109 may be made substantially or entirely from wax 78 in a solid state in the general shape of a wheel. It should be understood that the general shape of a wheel is intended to include a cylindrical body. In some embodiments, wax 78 may be enclosed in a housing 110. Housing 110 may include perforations 112 through which wax 78 may be squeezed for application onto streamer 6. Pressure may be applied to wax 78 in housing 110 to squeeze wax through perforations 112. Any suitable technique may be used for application of pressure, including, but not limited to air pressure or mechanical force (e.g., mechanical spring). In some embodiments, wax 78 in housing 110 may be in a liquid or semi-solid state. As illustrated, streamer 6 may pass through wheel applicators 109 in the direction indicated by arrow 48. Wheel applicators 109 may engage streamer 6 so that wax 78 may be transferred from wheel applicators 109 to streamer 6, forming wax coating 38, as streamer 6 passes through wheel applicators 109. In some embodiments, wheel applicators 109 may rotate in a direction (indicated by arrows 114) that is opposite the direction indicated by arrow 48 of streamer 6 movement. In some embodiments, wheel applicators 109 may rotate such that there is a relative velocity between streamer 6 and wheel applicators 109. In some embodiments, contact between wheel applicators 109 and streamer 6 may generate frictional energy. In some embodiments, the frictional energy may be sufficient to heat and soften wax 78. In some embodiments, portions of wax 78 in proximity to wheel applicators 109 may soften prior to application onto streamer 6 so that wax 78 may be transferred to streamer 6. In some embodiments, a post-application heating treatment may be applied to wax coating 38. For example, a heating chamber 74 (e.g., shown on FIGS. 5, 6, 8) may be used to heat wax coating 38 on streamer 6.

Figure 14:
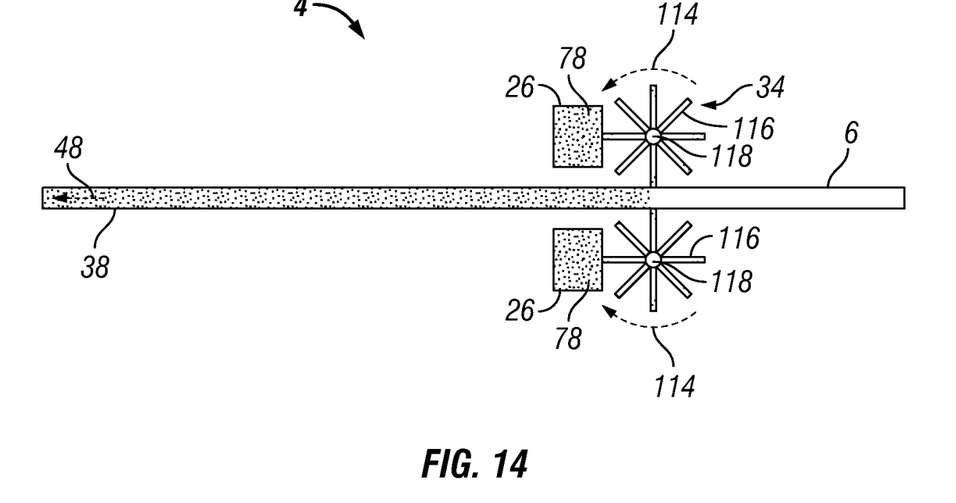
FIG. 14 illustrates another embodiment of a wax application system for application of wax onto a streamer.

FIG. 14 illustrates another embodiment of wax application system 4 for application of wax 78 onto streamer 6. As illustrated, wax application system 4 may include wax reservoir 26 and wax applicator 34. Wax reservoir 26 may contain wax 78, which may be in a solid or semi-solid state. In some embodiments, there may be more than one wax reservoir 26, as shown on FIG. 14. Wax applicator 34 may include brush applicators 116. Brush applicators 116 may be operable to rotate about rotational axis 118. Two or more brush applicators 116 may be positioned around the circumference of streamer 6. Brush applicators 116 may contact streamer 6 as streamer 6 passes through brush applicators 116 in the direction indicated by arrow 48. Brush applicators 116 may also contact wax 78 in wax reservoir 26 as brush applicators 116 rotate. Accordingly, as brush applicators 116 rotate, wax 78 from wax reservoir 26 may be transferred to brush applicators 116 and then deposited onto streamer 6, forming wax coating 38. In some embodiments, the brush applicators 116 may rotate in a direction (indicated by arrows 114) that is opposite the direction indicated by arrow 48 of streamer 6 movement. In some embodiments, brush applicators 116 may rotate such that there is a relative velocity between streamer 6 and wheel applicators 109. In some embodiments, a post-application heating treatment may be applied to wax coating 38. For example, a heating chamber 74 (e.g., shown on FIGS. 5, 6, 8) may be used to heat wax coating 38 on streamer 6.

Figure 15:
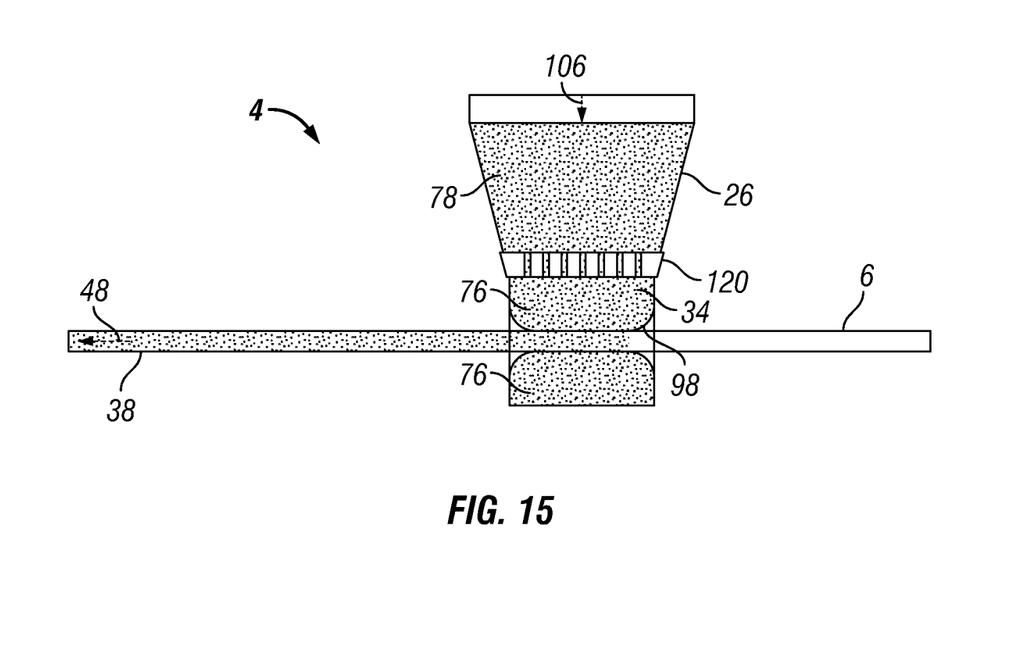
FIG. 15 illustrates another embodiment of a wax application system for application of wax onto a streamer.

FIG. 15 illustrates another embodiment of wax application system 4 for application of wax 78 onto streamer 6. Wax application system 4 is similar to the embodiment of FIG. 9 except that wax 78 may be in a liquid state (or semi-solid state) when applied to streamer 6. As illustrated, wax application system 4 may include wax reservoir 26 and wax applicator 34. Wax reservoir 26 may contain wax 78, which may be in a solid or semi-solid state, for example. Wax 78 may be delivered onto a streamer 6 by way of wax applicator 34. Wax 78 may be pressed through extruder device 120. Wax 78 may be pressed through extruder device 120 by application of force, indicated by arrow 105. Any suitable technique may be used for application of force, including air pressure and mechanical devices (e.g., mechanical springs). As illustrated, extruder device 120 may include channels 122 through which wax 78 may be extruded into wax applicator 34. Wax applicator 34 may be in contact with streamer 6. Wax 78 may flow through wax applicator 34 and be transferred to streamer 6, forming wax coating 38. As illustrated, wax applicator 34 may have a contact surface 98 in engagement with streamer 6. To ensure sufficient distribution of wax 78 on streamer 6, in some embodiments, contact surface 98 may be in contact with streamer 6 around the entire circumference of streamer 6. Wax applicator 34 may heated so that wax 78 passing through wax applicator may transform to a liquid or semi-solid state. By heating wax 78, wax 78 may be applied to streamer 6 more evenly with removal of excess wax 78 and an even surface finish. Wax applicator 34 may be made from any suitable material, including but not limited to, metal or polymers. In some embodiments, wax applicator 34 may include internal conduits 76 for even distribution of wax 78 onto contact surface 98 in engagement with streamer 6. Wax 78 may pass through internal conduits 76 to contact surface 98 and then be disposed on streamer 6.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A marine geophysical survey system comprising:
   a streamer; and
   a wax application system operable to receive the streamer on deployment and apply a wax coating to the streamer as the streamer is being deployed from a survey vessel into a body of water, wherein the wax application system comprises one or more wheel applicators positionable around a circumference of the streamer, wherein the one or more wheel applicators are formed from a wax in a solid state.

2. A marine geophysical survey system comprising:
   a streamer;
   a drying unit operable to dry the streamer as the streamer is being deployed from a survey vessel into a body of water; and
   a wax application system operable to receive the streamer on deployment and apply a wax coating to the streamer as the streamer is being deployed from the survey vessel into the body of water, wherein the wax application system comprises one or more wheel applicators positionable around a circumference of the streamer, wherein the one or more wheel applicators are formed from a wax in a solid state.

* * * * *